Patented June 28, 1927.

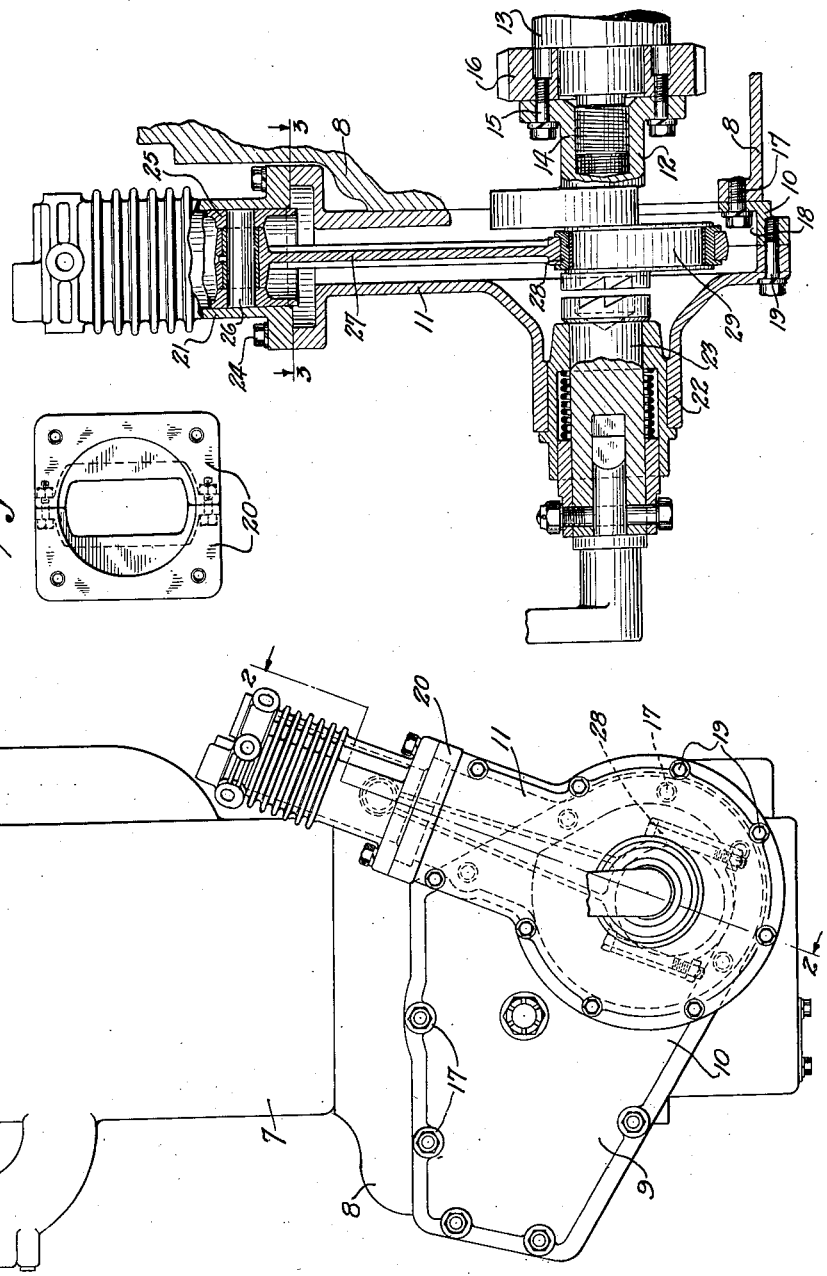

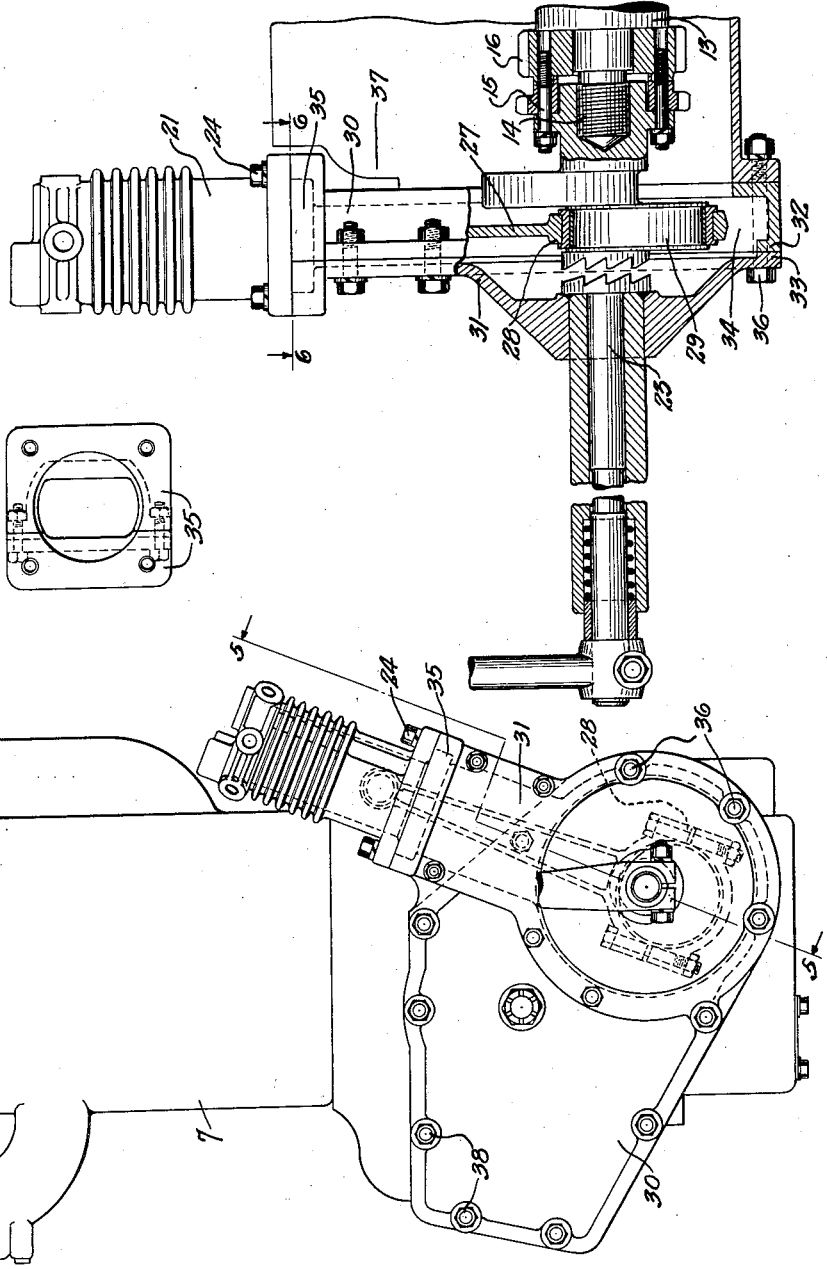

1,633,768

UNITED STATES PATENT OFFICE.

NIELS A. CHRISTENSEN, OF CLEVELAND, OHIO.

AUTOMOTIVE ENGINE COMPRESSOR.

Application filed January 18, 1926. Serial No. 82,095.

The invention relates to compressors, and more particularly to compressors associated with an internal combustion engine for furnishing compressed air for starting the engine, or for brake equipment where the engine is used on automotive vehicles.

The object of the invention is to provide a compressor mounting in which the front end cover-plate of the engine is formed of separable sections dividing the crank case and the compressor cylinder support into sections so that the removal of the cylinder and the front section of the cover-plate permits complete inspection and ready removal of bearings and other parts needing adjustment or renewal.

The invention further consists in the several features hereinafter set forth and more particularly defined by claims at the conclusion hereof.

In the drawings, Fig. 1 is a front elevation view of an automotive type engine equipped with apparatus embodying the invention;

Fig. 2 is a view, partly in elevation and partly in section, along the line 2—2 of Fig. 1;

Fig. 3 is a detail sectional view taken on the line 3—3 of Fig. 2;

Fig. 4 is a view similar to Fig. 1, showing a modification;

Fig. 5 is a view, partly in elevation and partly in section, along the line 5—5 of Fig. 4;

Fig. 6 is a detail sectional view taken along the line 6—6 of Fig. 5.

In the drawings the numeral 7 designates an internal combustion engine of the high speed or automotive type, in which the gears for the auxiliary drives are mounted at the front end of the crank case 8 of the engine, within a housing formed by the engine crank case and a front cover-plate. According to the present invention, the front cover-plate 9 is formed of two sections 10 and 11 through which a shaft section 12 extends, said shaft section being secured to the main crank shaft 13 of the engine by a threaded connection 14 therewith and bolts 15 which lock the shaft 12 to one of the timing or auxiliary drive gears 16 which is keyed to the crank shaft 13. It will, of course, be understood that the main bearings for the crank shaft are within the engine crank case proper adjacent the throws of the crank shaft.

The section 10 of the front cover plate is detachably secured to the front end of the crank case 8 of the engine by means of bolts 17, and has a compressor crank case portion 18 with flanged edges detachably secured to the complementary flanged edge of the section 11 by bolts 19 so as to connect these sections together to form the complete crank case of the compressor, and a flanged pad portion 20 to receive the cylinder 21 of the compressor.

The section 11 of the compressor has a bearing extension 22 in which the starter-claw-shaft 23 is mounted.

The cylinder 21 of the compressor is detachably secured to the two-part base 20 by bolts 24 which secure it to adjacent sections of the cover-plate and has the usual piston 25 working therein connected by a wrist-pin 26 with a connecting-rod 27 whose adjustable big end-bearing 28 is mounted on an eccentric 29 on the shaft 12.

The inlet and exhaust valves of the compressor are not shown in detail, but may be of any suitable construction.

With this construction the piston 25 of the compressor is driven by the engine crank shaft to compress air in the compressor cylinder and expel it to the reservoir. As the cylinder is removable independent of the cover-plate, the piston rings and wrist-pin may be readily inspected or removed, when desired, by taking off said cylinder. In case any adjustment or renewal of the big end bearing of the connecting-rod is necessary, the removal of the cylinder 21 permits taking off the section 11 of the front cover-plate by the release of the bolts 19, and this permits ready access to said big end-bearing and permits the connecting-rod being loosened from the eccentric and moved bodily forward out of the then open end of the cover-plate without any interference.

In the construction shown in Figs. 4 to 6, inclusive, the compressor cylinder, the piston and its connections with the shaft 12, are the same as previously described, but in this case the front end cover-plate is made up of two sections 30 and 31 whose flanged edges 32 and 33 join or abut each other in a vertical plane slightly offset forwardly from the center line of the crank case 34 and, as before, each of these sections cooperates to form a two-part compuressor cylinder pad portion 35. The sections 30 and 31 are detachably secured together by bolts 36 and the section 30 is, in addition, detachably secured to the crank case 37 of the engine by bolts 38. The same advantages of inspection and adjustment as described in connection with the first construction are obtained in this modified form of construction.

It will be noted that both constructions provide a crank case split along its entire length through the mounting-pad portion so as to permit ready removal of the connecting-rod directly from the front without removing that section adjacent the engine crank case.

I desire it to be understood that this invention is not to be limited to any specific form or arrangement of parts except in so far as such limitations are specified in the claims.

What I claim as my invention is:

1. In an internal combustion engine, a front cover-plate forming a compressor crank case and compressor cylinder support, comprising a cover section detachably secured to the crank case of the engine, and a cover section detachably secured to said first-named cover section, said sections being joined together along a plane extending through the compressor crank case and the compressor cylinder support whereby the removal of the second-named cover section provides access to the drive for the compressor including the connecting rod and its drive shaft and permits inspection and adjustment of the big end bearing of said connecting-rod while assembled to its drive shaft.

2. In an internal combustion engine, the combination with the engine crank case of a sectional front cover-plate composed of complementary compressor crank case and cylinder-supporting sections detachably secured together, one of said sections being detachably secured to the crank case of the engine.

3. In an internal combustion engine, a sectional front cover-plate detachably secured to the crank case of the engine, the sections dividing said cover plate along a vertical plane extending through the cylinder-mounting portion of said plate and the compressor crank case portion thereof, a compressor cylinder having a base portion, and bolts detachably connecting said base portion with adjacent sections of said cover-plate.

4. In an internal combustion engine, the combination with the engine crank case and the engine crank shaft, of a front cover plate secured to said crank case and forming a compressor crank case, a compressor-cylinder-support, a compressor cylinder mounted on said support, a piston working in said cylinder, a connecting-rod operatively connected to the piston, said crank shaft having a threaded end, and a crank member detachably secured to said threaded end of the crank shaft and forming an extension thereof and connected with said connecting-rod.

5. In an internal combustion engine, the combination with the engine crank case and the engine crank shaft, of a front cover plate secured to said crank case and forming a compressor crank case, a compressor-cylinder-support, a compressor cylinder mounted on said support, a piston working in said cylinder, a connecting-rod operatively connected to the piston, said crank shaft having a threaded shank portion at its outer end, a drive eccentric for said connecting-rod and having a threaded bore engaging said threaded shank portion, and means for preventing rotational movement of said eccentric relative to said crank shaft.

In testimony whereof, I affix my signature.

NIELS A. CHRISTENSEN.